United States Patent [19]

Hayakawa

[11] Patent Number: 5,404,971
[45] Date of Patent: Apr. 11, 1995

[54] ADJUSTER RELEASING APPARATUS IN DRUM BRAKE

[75] Inventor: Yoshiro Hayakawa, Saitama, Japan

[73] Assignee: Akebono Brake Industry Co., Ltd., Tokyo, Japan

[21] Appl. No.: 67,852

[22] Filed: May 27, 1993

[30] Foreign Application Priority Data

May 29, 1992 [JP] Japan .............................. 4-042600 U

[51] Int. Cl.[6] .............................................. F16D 65/38
[52] U.S. Cl. ......................... 188/196 BA; 188/79.62; 188/71.9
[58] Field of Search ............ 188/196 BA, 79.62, 71.9, 188/196 D, 196 B; 192/111 A

[56] References Cited

U.S. PATENT DOCUMENTS

| | | | |
|---|---|---|---|
| 4,056,175 | 11/1977 | Newstead | 188/196 BA |
| 4,926,980 | 5/1990 | Cumming | 188/196 BA |
| 5,031,731 | 7/1991 | McKay | 188/196 BA |

FOREIGN PATENT DOCUMENTS 247779 12/1990 Japan .

Primary Examiner—Robert J. Oberleitner
Assistant Examiner—Clifford T. Bartz
Attorney, Agent, or Firm—Cushman Darby & Cushman

[57] ABSTRACT

An adjuster releasing apparatus for a drum brake in which an adjuster lever is pushed up by a pin-shaped member inserted from an opening of a backing plate, a stopper for limiting the movement amount of push-up of the adjuster lever in the state where the adjuster lever is pushed up to thereby release its engagement with an adjuster gear is provided on the backing plate side.

4 Claims, 2 Drawing Sheets

ADJUSTER RELEASING APPARATUS IN DRUM BRAKE

BACKGROUND OF THE INVENTION

The present invention relates to an adjuster releasing apparatus for a drum brake.

A conventional adjuster releasing apparatus of a manual type for use in a drum brake is disclosed, for example, in an Examined Japanese Utility Model Publication No. Hei. 2-47779. In the conventional apparatus of this type, a second operation opening portion passing from a backing plate side to an adjuster lever side is formed on a web of brake shoes. In such a configuration, a first driver is inserted from a first operation opening portion of the backing plate and a second driver is inserted from the first and second operation opening portions, so that an adjuster gear is rotated by the first driver whereas the adjuster lever is pushed by the second driver thereby to disengage from the adjuster gear. As a result, the adjuster gear and an adjuster screw rotate relatively to each other so that the adjuster screw axially moves and the brake shoes engaging with the adjuster screw are radially expanded or contracted to thereby adjust a shoe gap.

In such a conventional adjuster releasing apparatus installed in a drum brake, however, there is a possibility that the adjuster lever is plastically deformed so that in its normal function is damaged by strong pushing force when the adjuster lever is pushed up by the second driver. Accordingly, the adjuster lever is subjected to flange-working or carburizing quenching to improve the rigidity thereof. There would however raise another technical problem in that not only the work is troublesome but defective products are apt to be generated because of large deformation due to quenching.

SUMMARY OF THE INVENTION

The present invention has been accomplished in view of the foregoing technical problem accompanying the conventional apparatus.

It is an object of the present invention to provide an adjuster releasing apparatus for use in a drum brake with which an adjuster lever is not plastically deformed by any pushing pressure.

It is another object of the invention to provide an adjuster releasing apparatus simple in construction and improving in yield rate.

It is still another object of invention to provide an adjuster releasing apparatus with which workability of the manual adjustment in the adjuster device can be remarkably improved.

The above and other objects can be achieved by a provision of an adjuster releasing apparatus which, according to the present invention, includes a backing plate fixed to a stationary portion of a vehicle, a pair of brake shoes disposed on the backing plate, an actuator means disposed between ends portions of said pair of brake shoes and an adjuster device incorporated with the pair of brake shoes facing each other and provided with an adjuster gear which is adapted to unidirectionally rotate to make the adjuster device expand so as to open the brake shoes and an adjuster lever which engages with the adjuster gear and which is adapted to be pushed up by a pin-shaped member inserted from an opening of the backing plate. The apparatus of the invention further comprises a stopper for limiting a pushing-up movement of the adjuster lever in a state where the adjuster lever is pushed up and the engagement of the adjusting lever with the adjuster gear is released.

When the shoe gap is to be manually adjusted, for example, in the case where a worn-away brake shoe is exchanged, the pin-shaped member such as a driver or the like is inserted from the opening of the backing plate to push up the adjuster lever by the forward end portion of the pin-shaped member so as to release the engagement of the adjuster lever with the adjuster gear. At this time, the movement amount of push-up of the adjuster lever is limited by the stopper so that the adjuster lever is prevented from being plastically deformed.

Next, a tool such as a driver or the like is inserted from the same or another opening of the backing plate to thereby rotate the adjuster gear forward/backward so that the shoe gap can be manually adjusted so as to be widened or narrowed. Since the adjuster lever is being engaged with the stopper in the state where the engagement between the adjuster lever and the adjuster gear is released by the pin-shaped member to prevent the generation of plastic deformation of the adjuster lever, the adjuster lever can be elastically restored so as to surely engage with the adjuster gear if the pin-shaped member is taken out after completion of adjustment of the shoe gap.

In such a configuration, it is possible to extremely efficiently perform the adjustment work to bring the shoe gap into a normal state in the work of removing or assembling a drum brake from or into a vehicle and the diameter-reduction work of the brake shoe in the exchange work thereof.

DESCRIPTION OF THE PREFERRED EMBODIMENTS

Next, description will be made as to an embodiment of the present invention with reference to the accompanying drawings.

Figure 1:
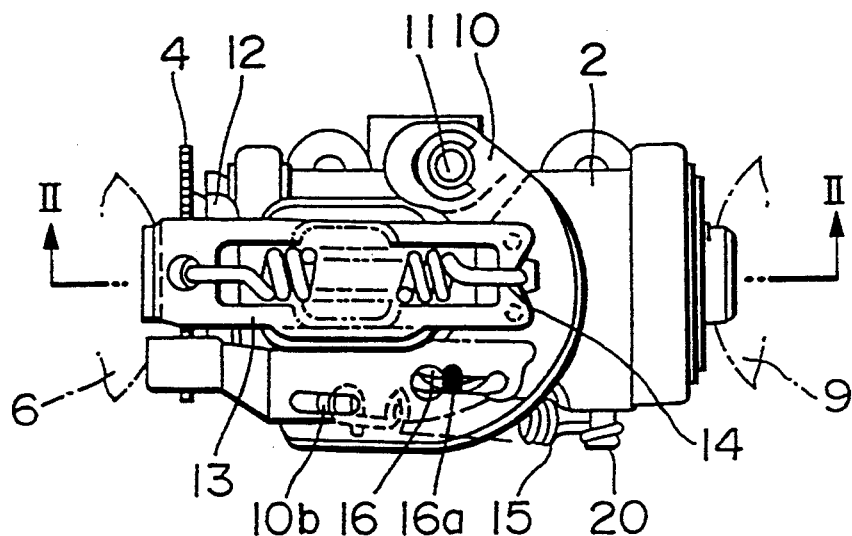
FIG. 1 is a plan showing an adjuster releasing apparatus in a drum brake according to an embodiment of the present invention.
Figure 2:
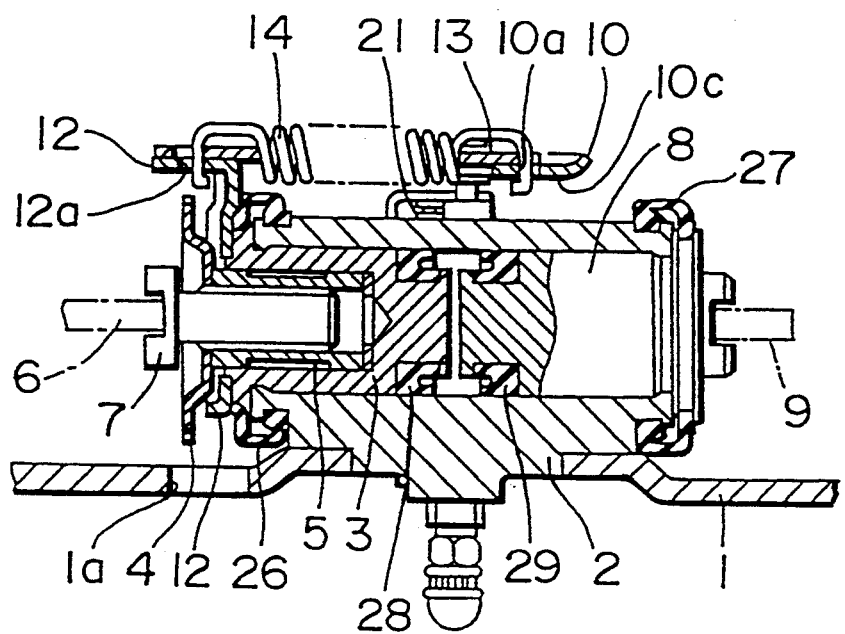
FIG. 2 is a sectional view taken on line II—II of FIG. 1.

FIGS. 1 through 4 show an embodiment in which the present invention is applied to a wheel cylinder of a two-leading brake. In the drawings, the reference numeral 1 designates a backing plate fixed, through bolts, to a stationary member such as an axle pipe (not shown) or the like on the car body side. The reference numeral 2 designates a wheel cylinder body attached to the backing plate 1 through bolts (not shown) so as to be disposed between respective end portions of a pair of brake shoes 6 and 9 facing each other. As shown in FIG. 2, a piston 3 is slidably inserted into the wheel cylinder body 2 through a cup seal 28, an adjuster nut 5 having an adjuster gear 4 is rotatably inserted into the piston 3, and a not-rotatable adjuster screw having front-end fork portion on which one brake shoe 6 is supported is thread engaged with the adjuster nut 5.

The reference numeral 8 designates a piston having an outer end portion at which the other brake shoe 9 is supported. The piston 8 is slidably inserted into the wheel cylinder body 2 through a cup seal 29 so as to constitute a double-open wheel cylinder. The reference numeral 26 designates a dust preventing boot which covers a gap between the piston 3 and the wheel cylinder body 2, and the reference numeral 27 designates a dust preventing boot which covers a gap between the piston 8 and the wheel cylinder body 2.

Figure 3:
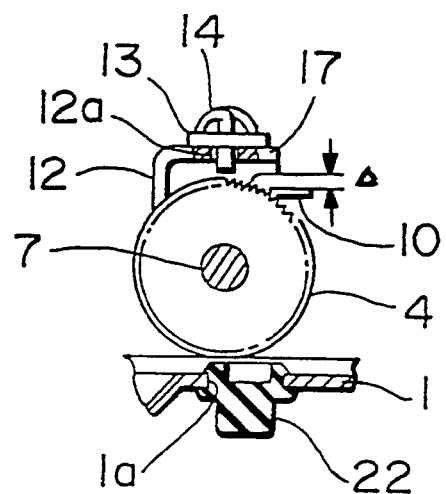
FIG. 3 is a front view schematically showing the same adjuster releasing apparatus.

An adjuster lever 10 is formed into a reversed J-shape as shown in FIG. 1, one end portion of the adjuster lever 10 being swingably pivoted, through a pin 11, on an outer surface of the wheel cylinder body 2, the other end portion of the same being engaged with the adjuster gear 4 so as to be fed only in one direction as shown in FIG. 3, and a middle portion of the same being connected to the piston 3 through an overtravel spring 14. The shrinkage length of the overtravel spring 14 is limited by a fitting 13. A front end portion of the overtravel spring 14 is engaged with an engagement portion 12a of a piston bracket 12 fixedly provided on the piston 3 and a rear end portion of the same is engaged with an engagement portion 10a of a middle portion of the adjuster lever 10.

The reference numeral 15 of FIG. 1 designates a return spring for the adjuster lever 10. The return spring 15 is engaged at its front end with an engagement portion 10b of the adjuster lever 10 and engaged at its rear end with a pin 20 fixedly provided on the wheel cylinder body 2 so that the return spring 15 has a function that the return spring 15 urges the adjuster lever 10 backward and at the same time urges the other end portion of the adjuster lever 10 against the adjuster gear 4 so that the adjuster lever 10 engages with the adjuster gear 4. The reference numeral 16a designates a bent portion for preventing the adjuster lever 10 from shaking, the bent portion 16a being formed by bending a support plate 16 fixedly provided on the wheel cylinder body 2. Thus, the wheel cylinder armoring automatic adjuster device is constituted.

An opening 1a is formed through the backing plate 1 at a predetermined position thereof. The opening 1a is used for inserting, from the back, a pin-shaped member 19 such as a driver or the like and a tool 18 such as a driver or the like shown in FIG. 4. That is, the opening 1a is formed in a position where the adjuster lever 10 can be pushed up by the pin-shaped member 19 and the adjuster gear 4 can be rotated by the tool 18.

Figure 4:
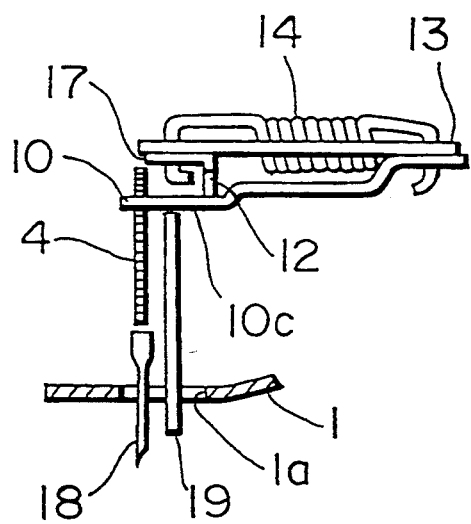
FIG. 4 is a view for explaining the operation.

Further, a part of the piston bracket 12 is extended sideward so as to form a stopper 17 so that a predetermined gap Δ shown in FIG. 3 is formed between a lower surface of the stopper 17 and an upper surface of the adjuster lever 10. The predetermined gap Δ has a function so that when the pin-shaped member 19 of FIG. 4 is inserted from the opening 1a of the backing plate 1 to thereby push up the adjuster lever 10 so as to release the engagement of the adjuster gear 4 with the adjuster lever 10, the adjuster lever 10 is prevented from being excessively pushed up, and formed so as to have such a size that the adjuster lever 10 is engaged with the stopper 17 without generating plastic deformation. The reference 22 shown in FIG. 3 designates a rubber cover removably fitted in the opening 1a of the backing plate 1 for preventing rain water, dust, or the like from entering the backing plate 1.

Next, description will be made as to the operation of the foregoing embodiment.

A brake liquid is supplied into the wheel cylinder body 2 and the pistons 3 and 8 are stroked so that the brake shoes 6 and 8 are made to come into contact with a brake drum (not shown) to produce braking force.

Now, if a shoe gap of the brake shoe 6 exceeds a normal one, the adjuster lever 10 is pulled by the overtravel spring 14 as the piston 3 strokes so that the adjuster lever 10 swings about the pin 11 to feed the adjuster gear 4 by one tooth to screw out the adjuster screw 7 to thereby automatically adjust the shoe gap. After the brake shoe 6 has come into contact with the brake drum, the axial force of the adjuster screw 7 increases so that the overtravel spring 14 expands as the piston 3 strokes thereafter and the adjuster lever 10 does not swing to prevent the adjustment rotation of the adjuster gear 4. As a result, the automatic adjuster device is prevented from being damaged.

When braking is released, the brake shoes 6 and 9 are returned to their original positions by the spring force of shoe return springs (not shown) and the adjuster lever 10 is subjected to the action of the return spring 15 so that it is returned to its original position. Also the expanded overtravel spring 14 contracts to engage with the fitting 13.

Next, when the shoe gap is to be manually adjusted, for example, in the case where the worn-away brake shoe 6 is exchanged, the rubber cover 22 is removed, the pin-shaped member 19 is inserted from the opening 1a of the backing plate 1, and the front end portion of the pin-shaped member 19 is urged against an inner surface 10c of the one end portion of the adjuster lever 10 to thereby push-up the one end portion of the adjuster lever 10 so as to release the engagement of the adjuster lever 10 with the adjuster gear 4. At this time, since the movement amount of push-up of the adjuster lever 10 is limited by the stopper 17, the adjuster lever 10 is prevented from being excessively pushed up. In this embodiment, the pushed-up adjuster lever 10 abuts on a portion of the stopper 17 which is bent so as to give rigidity to the stopper 17.

Next, the tool 18 such as a driver or the like is inserted from the opening 1a of the backing plate 1 so as to rotate the adjuster gear 4 forward/backward so that the movement of projection of the adjuster screw 7 and hence the shoe gap can be manually adjusted to be increased or decreased.

In such a configuration, it is possible to extremely efficiently perform the adjustment work to bring the shoe gap into a normal state in the work of removing or assembling a drum brake from or into a vehicle and the diameter-reduction work of the brake shoe 6 in the exchange work thereof.

Although the pin, shaped member 19 such as a driver or the like is inserted from the opening 1a of the backing plate 1 in the foregoing embodiment, the pin-shaped member may be always ready in the opening 1a of the backing plate 1. Further, although the pin-shaped member 19 and the tool 18 are inserted from the opening 1a of the backing plate 1 in the foregoing embodiment, openings for inserting the pin-shaped member 19 and the tool 18 therefrom may be provided separately from each other. Moreover, the stopper 17 may be formed by extending another member of the automatic adjuster device, for example, the fitting 13 sideward. Furthermore, when the adjuster device is of the manual type, a member provided separately from the adjuster device is fixedly provided on the wheel cylinder body 2 or the backing plate 1 so as to form the stopper 17. If the stopper 17 is formed by extending parts such as the piston bracket 12, the fitting 13, or the like of the automatic adjuster device, however, the configuration is simple because no other parts are required additionally.

As understood by the foregoing explanation, in the adjuster releasing apparatus in a drum brake according to the present invention, the following effects can be obtained.

(1) Since manual adjustment can be performed in the state where the adjuster lever is engaged with the stopper, such a possibility that the adjust lever is pushed so strong as to be plastically deformed is eliminated. As a result, it is possible to prevent the function of the adjuster lever, and hence the function of the adjuster device from being damaged. Further, it is not necessary to perform working for improving the rigidity of the adjuster lever so that the configuration can be simplified and generation of defective products due to such working can be eliminated.

(2) Since manual adjustment is performed in the state where the adjuster lever is engaged with the stopper, the nodal feeling can be obtained in releasing the adjuster lever. As a result, the workability of the manual adjustment in the adjuster device can be remarkably improved.

What is claimed is:

1. An adjuster releasing apparatus for use in a drum brake, comprising:
    a backing plate fixed to a stationary portion of a vehicle, said backing plate having an opening portion;
    a wheel cylinder body;
    a piston disposed in said wheel cylinder body;
    a pair of brake shoes disposed on said backing plate, said pair of brake shoes having end portions;
    actuator means disposed between said end portions of said pair of brake shoes; and
    an adjuster device incorporated with said actuator means, said adjuster device comprising:
        an adjuster gear, which is adapted to unidirectionally rotate, for expanding said brake shoes;
        an elastically deformable adjuster lever being pivotally mounted on said actuator means and normally engaging with said adjuster gear, said adjuster lever capable of being pushed up by a pin-shaped member inserted from said opening portion of said backing plate; and
        stopper means, directly connected to said piston for limiting a movement of said adjuster lever when said adjuster lever is pushed up to release said engagement of said adjusting lever with said adjuster gear.

2. The adjuster releasing apparatus of claim 1, wherein said stopper means is bent at a portion which abuts against said adjuster lever when said lever is pushed up.

3. The adjuster releasing apparatus of claim 1, wherein said stopper means is formed integrally with a part of said adjuster device.

4. The adjuster releasing apparatus of claim 1, wherein said stopper means is formed separately from said adjuster device.

* * * * *